US012799315B2

(12) United States Patent
Ruthard et al.

(10) Patent No.: US 12,799,315 B2
(45) Date of Patent: Nov. 17, 2026

(54) STYRENE COPOLYMER MOLDING COMPOSITIONS WITH REDUCED MOLD DEPOSIT FORMATION FOR HIGH GLOSS APPLICATIONS

(71) Applicant: INEOS STYROLUTION GROUP GMBH, Frankfurt am Main (DE)

(72) Inventors: Christian Ruthard, Mainz (DE); Oliver Carstensen, Frankfurt (DE); Eric Chambost, Soisy-sous-Montmorency (FR)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 976 days.

(21) Appl. No.: 17/766,877

(22) PCT Filed: Oct. 13, 2020

(86) PCT No.: PCT/EP2020/078789
§ 371 (c)(1),
(2) Date: Apr. 6, 2022

(87) PCT Pub. No.: WO2021/074155
PCT Pub. Date: Apr. 22, 2021

(65) Prior Publication Data

US 2024/0093018 A1 Mar. 21, 2024

(30) Foreign Application Priority Data

Oct. 15, 2019 (EP) .................................... 19203367

(51) Int. Cl.
*C08L 25/12* (2006.01)
*B60R 13/00* (2006.01)
(Continued)

(52) U.S. Cl.
CPC ............... *C08L 25/12* (2013.01); *C08J 3/203* (2013.01); *C08K 13/02* (2013.01); *B60R 13/00* (2013.01); *C08J 2325/12* (2013.01); *C08J 2425/16* (2013.01); *C08J 2433/10* (2013.01); *C08K 3/04* (2013.01); *C08K 5/12* (2013.01); *C08K 5/3435* (2013.01); *C08K 5/34926* (2013.01);
(Continued)

(58) Field of Classification Search
CPC . B60R 1/06; B60R 13/00; B60R 19/52; C08J 2325/04; C08J 2325/12; C08J 2325/16; C08J 2425/16; C08J 2433/10; C08J 3/203; C08K 13/02; C08K 2201/014; C08K 3/04; C08K 5/12; C08K 5/3435; C08K 5/34926; C08L 2201/08; C08L 2203/30; C08L 2205/025; C08L 2205/03; C08L 2205/035; C08L 2205/06; C08L 25/12; C08L 25/16; C08L 51/04
See application file for complete search history.

(56) References Cited

U.S. PATENT DOCUMENTS

| | | | |
|---|---|---|---|
| 3,553,167 | A | 1/1971 | Schnell |
| 4,075,173 | A | 2/1978 | Maruyama |

(Continued)

FOREIGN PATENT DOCUMENTS

| | | | |
|---|---|---|---|
| CA | 1173998 | A | 9/1984 |
| CN | 1269808 | A | 10/2000 |

(Continued)

OTHER PUBLICATIONS

W. Wohlleben, H. Schuch, Measurement of Particle Size Distribution of Polymer Latexes, 2010, Editors: L. Gugliotta, J. Vega, pp. 129-153.
Carlsson et al., "Decomposition of Polypropylene Hydroperoxide by Hindered Amines", Journal of Polymer Science: Polymer Chemistry Edition (1982), vol. 20, pp. 575-582.

*Primary Examiner* — Ana L. Woodward
(74) *Attorney, Agent, or Firm* — RAPHAEL BELLUM PLLC

(57) ABSTRACT

The invention relates to a thermoplastic molding composition (P) comprising: (A) 81.1 to 99.7 wt.-% of at thermoplastic polymer composition (A) comprising: (A-1) graft copolymer (A-1), and (A-2) thermoplastic matrix (A-2) based on vinylaromatic copolymers; (B) at least one hindered amine light stabilizing composition (B) comprising: (B-1) 0.2 to 0.9 wt.-%, of at least one hindered amine light stabilizer having a dipiperidine structure with at least one alkyl group at each of the 2 and 6 positions of the dipiperidine structure and (B-2) 0.1 to 0.9 wt.-%, of a hindered amine light stabilizer mixture having a monopiperidine structure with at least one alkyl group at each of the 2 and 6 positions of the monopiperidine structure and (B-3) 0 to 2 wt.-%, of at least one hindered amine light stabilizer having a polymeric structure comprising piperidine groups with at least one alkyl group at each of the 2 and 6 positions of the piperidine groups, (C) 0 to 10 wt.-%, of colorants, dyes and/or pigments (C); and (D) 0 to 5 wt.-%, of further additives (D) different from (B) and (C); provided that the thermoplastic molding composition (P) further comprises 0.001 wt.-% to 0.1 wt.-%, based on the total weight of the molding composition (P), of oligomers and/or polymers comprising ethylene and/or propylene repeating units or provided that the thermoplastic molding composition (P) further comprises 0 wt.-%, based on the total weight of the molding composition (P), of oligomers and/or polymers comprising ethylene and/or propylene repeating units (as component E), wherein the constituents (A) to (E) sum up to 100 wt.-% of the molding composition (P).

15 Claims, No Drawings

(51) Int. Cl.

| | |
|---|---|
| ***C08J 3/20*** | (2006.01) |
| ***C08K 3/04*** | (2006.01) |
| ***C08K 5/12*** | (2006.01) |
| ***C08K 5/3435*** | (2006.01) |
| ***C08K 5/3492*** | (2006.01) |
| ***C08K 13/02*** | (2006.01) |

(52) U.S. Cl.
CPC .... *C08K 2201/014* (2013.01); *C08L 2201/08* (2013.01); *C08L 2203/30* (2013.01); *C08L 2205/025* (2013.01); *C08L 2205/035* (2013.01); *C08L 2205/06* (2013.01)

(56) References Cited

U.S. PATENT DOCUMENTS

| | | | | | |
|---|---|---|---|---|---|
| 4,156,069 | A | | 5/1979 | Prevorsek | |
| 4,224,419 | A | | 9/1980 | Swoboda | |
| 4,269,964 | A | | 5/1981 | Freitag et al. | |
| 4,311,823 | A | | 1/1982 | Mai | |
| 4,334,053 | A | | 6/1982 | Freitag | |
| 4,396,769 | A | | 8/1983 | Ferreira | |
| 4,492,791 | A | | 1/1985 | Orban | |
| 4,605,699 | A | | 8/1986 | Mitulla | |
| 4,634,734 | A | | 1/1987 | Hambrecht | |
| 4,692,486 | A | | 9/1987 | Gugumus | |
| 4,788,253 | A | | 11/1988 | Hambrecht | |
| 4,982,014 | A | | 1/1991 | Freitag | |
| 5,196,480 | A | * | 3/1993 | Seitz | C08L 25/12 525/71 |
| 6,323,279 | B1 | | 11/2001 | Güntherberg et al. | |
| 9,701,813 | B2 | | 7/2017 | Minkwitz | |
| 10,294,348 | B2 | | 5/2019 | Minkwitz | |
| 2012/0007283 | A1 | | 1/2012 | Minkwitz | |
| 2012/0046408 | A1 | * | 2/2012 | Minkwitz | C08K 5/34 524/504 |
| 2014/0329100 | A1 | | 11/2014 | Pepers et al. | |
| 2015/0065622 | A1 | | 3/2015 | Minkwitz et al. | |
| 2015/0291793 | A1 | | 10/2015 | Minkwitz et al. | |
| 2016/0297957 | A1 | | 10/2016 | Boeckmann et al. | |
| 2017/0145201 | A1 | | 5/2017 | Boeckmann et al. | |
| 2018/0066117 | A1 | * | 3/2018 | Banaszak | C08F 279/04 |
| 2019/0153219 | A1 | | 5/2019 | Harada et al. | |
| 2021/0332234 | A1 | | 10/2021 | Seidel et al. | |

FOREIGN PATENT DOCUMENTS

| | | | | | |
|---|---|---|---|---|---|
| CN | 109563335 | A | | 4/2019 | |
| CN | 110088202 | A | | 8/2019 | |
| DE | 1 495 626 | | | 6/1971 | |
| DE | 2 232 877 | A | | 1/1974 | |
| DE | 2714 544 | A1 | | 6/1977 | |
| DE | 27 03 376 | A | | 8/1977 | |
| DE | 28 26 925 | A1 | | 1/1980 | |
| DE | 28 42 005 | A1 | | 4/1980 | |
| DE | 30 00 610 | A1 | | 7/1980 | |
| DE | 29 40 024 | A1 | | 4/1981 | |
| DE | 31 49 358 | A1 | | 6/1983 | |
| DE | 3414118 | A1 | | 10/1985 | |
| DE | 3832396 | A1 | | 2/1990 | |
| DE | 10316198 | A1 | | 10/2003 | |
| EP | 0 093 693 | A2 | | 11/1983 | |
| EP | 450485 | A | * | 10/1991 | C08L 25/12 |
| EP | 2593510 | A1 | | 5/2013 | |
| GB | 2387387 | A | | 10/2003 | |
| WO | 2012/007268 | A1 | | 1/2012 | |
| WO | 2013/000747 | A1 | | 1/2013 | |
| WO | 20150078751 | A1 | | 6/2015 | |
| WO | 2015/150223 | A1 | | 10/2015 | |
| WO | 2019/020686 | A1 | | 1/2019 | |
| WO | 2019/020688 | A1 | | 1/2019 | |

* cited by examiner

STYRENE COPOLYMER MOLDING COMPOSITIONS WITH REDUCED MOLD DEPOSIT FORMATION FOR HIGH GLOSS APPLICATIONS

Impact modified molding compositions, such as acrylonitrile styrene acrylate (ASA), and blends thereof with other thermoplastic polymers are widely used in many applications such as, e.g., in automotive industry, electronic industry or for household goods. The popularity of these thermoplastic polymer compositions may be attributed to their balanced properties of good impact strength, melt flow characteristics and high weathering stability.

A significant application area for ASA polymers are unpainted parts in exterior automotive applications such as front grills or side mirrors that are often colored in black. In such parts automotive producers require next to primary material properties such as impact and thermal properties also a certain stability of surface appearance upon exposure to UV light and weathering conditions over an extended period of time (several thousand hours). Often laboratory weathering exposure tests are used by automotive producers to simulate outdoor exposure over a period of years and thereafter surface appearance is often judged by changes of surface color or gloss level. Whereas in more traditional designs unpainted exterior automotive parts have been usually decorated with a grained and thus low gloss surface texture there is a clear design trend in recent years for automotive exterior parts with a high gloss surface finish or with a combination of high and low gloss surface areas. This leads to a growing need for thermoplastic compositions with high stability of surface appearance of high gloss surface areas. High gloss surface areas in this invention are defined as surface areas with a gloss level above 75 gloss units determined at a measuring angle of 60° according to DIN EN ISO 2813 (e.g. 2015).

The production of molded parts with high gloss surface leads to additional requirements compared to low gloss parts with surface grain. In order to produce high gloss parts with high surface quality, deposit formation on the mold surface during molding process needs to be reduced to a minimum as the sensitivity of defects is significantly larger for high gloss compared to low gloss parts.

It is the task of this invention to provide a novel thermoplastic molding composition with reduced mold deposit formation in the production of high gloss parts compared to prior art while keeping the weathering stability provided by prior art molding compositions.

UV stabilizers such as hindered amine light stabilizer (HALS) compounds or UV absorbers are often used in ASA formulations for use in exterior applications. Several documents such as U.S. Pat. Nos. 4,692,486, 9,701,813, EP-B 2593510 and DE-A 10316198 teach HALS stabilizers and combinations thereof as UV absorbers and light stabilizers. However, within our investigations we have found that ASA compositions using already described UV stabilizer formulations cannot meet the required combination of low mold deposit formation and high weathering resistance needed for high gloss exterior applications.

It has been, surprisingly, found that the thermoplastic molding composition of this invention comprising hindered amine light stabilizer (HALS) formulations combined with a strictly reduced or even eliminated amount of oligomeric or polymeric components comprising the monomers ethylene and propylene in the molding composition leads to a desired acceptable low mold deposit formation.

Accordingly, a first aspect of the present invention relates a thermoplastic molding composition (P) comprising (or consisting of):

(A) 81.1 to 99.7 wt.-%, based on the total weight of the molding composition (P), of at least one thermoplastic polymer composition (A) comprising:
  (A-1) at least one graft copolymer (A-1), and
  (A-2) at least one thermoplastic matrix (A-2) based on one or more vinylaromatic copolymers;

(B) at least one hindered amine light stabilizing composition (B) comprising:
  (B-1) 0.2 to 0.9 wt.-%, preferably 0.3 to 0.9 wt.-%, more preferably 0.4 to 0.9 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties (i.e. saturated or unsaturated esters having 12 to 21 carbon atoms) at one of the 3, 4 or 5 positions of the piperidine structures wherein the at least one hindered amine light stabilizer having a dipiperidine structure has a molecular weight of 200-550 g/mol,
  (B-2) 0.1 to 0.9 wt.-%, preferably 0.15 to 0.6 wt.-%, more preferably 0.2 to 0.4 wt.-%, based on the total weight of the molding composition (P), of a hindered amine light stabilizer mixture having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures, and
  (B-3) 0 to 2 wt.-%, preferably 0.1 to 2 wt.-%, more preferably 0.2 to 2 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, preferably of 1500-4000 g/mol, more preferably 2000-4000 g/mol;

(C) 0 to 10 wt.-%, preferably 0.1 to 10 wt.-%, based on the total weight of the molding composition (P), of one or more colorants, dyes and/or pigments (C); and (D) 0 to 5 wt.-%, preferably 0.05 to 5 wt.-%, based on the total weight of the molding composition (P), of one or more further additives (D) different from (B) and (C);

provided that the thermoplastic molding composition (P) further comprises 0.001 wt.-% to 0.1 wt.-%, preferably 0.001 wt.-% to 0.05 wt.-%, based on the total weight of the molding composition (P), of oligomers and/or polymers comprising ethylene repeating units and/or propylene repeating units (as component E), or provided that the thermoplastic molding composition (P) further comprises 0 wt.-%, based on the total weight of the molding composition (P), of oligomers and/or polymers comprising ethylene repeating units and/or propylene repeating units (as component E), wherein the constituents (A) to (E) sum up to 100 wt.-% of the molding composition (P).

Within this meaning of this invention oligomers are polymeric compounds comprising from 3 to 100 repeating units derived from monomers which are polymerized to make up the oligomers. Polymers are polymeric compounds comprising more than 100 repeating units derived from monomers which are polymerized to make up the oligomers. Homooligomers and homopolymers comprise only repeating units from one kind of monomers (e.g. ethene or propene). Copolymers and co-oligomers comprise repeating units from at least two kinds of different monomers (e.g. ethene and propene).

Within the present application, the carbon atoms in the piperidine moieties and the positions to which the substituents are attached, respectively, are numbered according to the following general chemical structure, wherein the nitrogen atom is numbered as position 1:

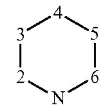

The thermoplastic molding compositions (P) comprise the thermoplastic polymer composition (A) and the components of the hindered amine light stabilizing composition (B).

In a further preferred embodiment, the invention relates to a molding composition (P), wherein the hindered amine light stabilizing composition (B) comprises:

(B-1) 0.2 to 0.9 wt.-%, preferably 0.3 to 0.9 wt.-%, more preferably 0.4 to 0.9 wt.-%, based on the total weight of the molding composition (P), of a compound represented by the chemical formula (I):

(I)

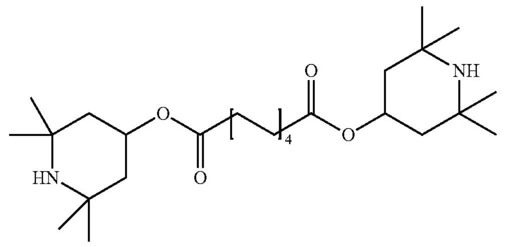

(B-2) 0.1 to 0.9 wt.-%, preferably 0.15 to 0.6 wt.-%, more preferably 0.2 to 0.4 wt.-%, based on the total weight of the molding composition (P), of a composition comprising at least one compound represented by the chemical formula (II):

(II)

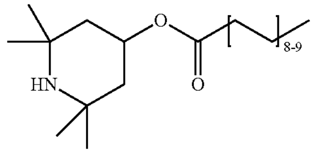

(B-3) 0 to 2 wt.-%, preferably 0.1 to 2 wt.-%, more preferably 0.2 to 2 wt.-%, based on the total weight of the molding composition (P), of a compound represented by the chemical formula (III):

(III)

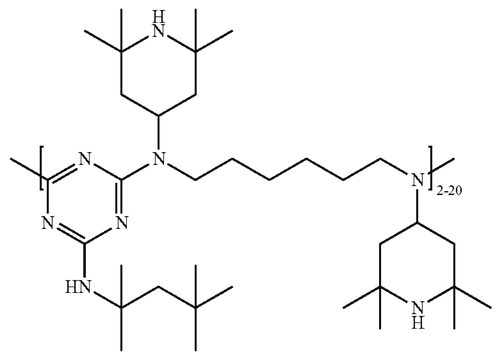

In a further embodiment, the invention relates to a molding composition (P) as previously defined, comprising as component (E):

0.001 to less than 0.1, preferably 0.005 to 0.05 wt.-%, based on the total weight of the molding composition (P), of one or more oligomeric or polymeric components (E) comprising repeating units derived from ethylene monomers or propylene monomers, in particular ethylene homopolymers and ethylene homooligomers (polyethylene), propylene homopolymers and propylene homooligomers (polypropylene) and ethylene/propylene copolymers and co-oligomers (poly(ethylene-co-propylene), and wherein the constituents (A) to (E) sum up to 100 wt.-% of the molding composition (P).

In an alternative embodiment, the invention relates to a molding composition (P) as previously defined, comprising as essentially no oligomeric or polymeric components (E) comprising repeating units derived from ethylene monomers or propylene monomers, in particular ethylene homopolymers (polyethylene), propylene homopolymers and oligomer (polypropylene) and ethylene/propylene copolymers and co-oligomers (poly(ethylene-co-propylene), and wherein the constituents (A) to (E) sum up to 100 wt.-% of the molding composition (P).

In a further embodiment, the invention relates to a molding composition (P) as previously defined, wherein the at least one graft copolymer (A-1) comprises or consist of an acrylonitrile styrene acrylate (ASA) copolymer comprising rubber particles having an average particle size $d_{50}$ of the rubber particles in the acrylonitrile styrene acrylate (ASA) copolymer from 50 to 1000 nm, wherein the average particle size is determined by scattered light measurement.

In a further embodiment, the invention relates to a molding composition (P) as previously defined, wherein the at least one thermoplastic matrix (A-2) comprises a copolymer which contains at least one type of vinyl cyanide repeating units and at least one type of vinylaromatic repeating units.

In a further embodiment, the invention relates to a molding composition (P) as previously defined, wherein the at least one thermoplastic polymer composition (A) comprises at least one copolymer (A-2) comprising:

18 to 45 wt.-% of at least one type of vinyl cyanide repeating units; and 55 to 82 wt.-% of at least one type of vinylaromatic repeating units.

In a further embodiment, the invention relates to a molding composition (P) as previously defined, wherein the at least one thermoplastic polymer composition (A) comprises:

(A-1) 5 to 50 wt.-%, based on the thermoplastic polymer composition (A), of at least one graft copolymer (A-1) comprising or consisting of an acrylonitrile styrene acrylate (ASA) copolymer having an average particle size $d_{50}$ of the rubber particles in the acrylonitrile styrene acrylate (ASA) copolymer from 50 to 1000 nm, wherein the average particle size is determined by scattered light measurement;

(A-2) 20 to 95 wt.-%, based on the thermoplastic polymer composition (A), of at least one thermoplastic matrix (A-2) comprising 18 to 45 wt.-%, based on the total weight of the thermoplastic matrix (A-2), of at least one type of vinyl cyanide repeating units and 55 to 82 wt.-%, based on the total weight of the thermoplastic matrix (A-2), of at least one type of vinylaromatic repeating units; and (A-3) 0 to 75 wt.-%, based on the thermoplastic polymer composition (A), of one or more additional thermoplastic polymers (A-3) that is substantially free of ethylene repeating units and/or propylene repeating units.

In a further embodiment, the invention relates to a molding composition (P) as previously defined, wherein the graft copolymer (A-1) comprises a bimodal or trimodal size distribution of the rubber particles comprising:

(A-1a) at least one graft copolymer (A-1a) having an average particle size $d_{50}$ of the rubber particles in the ASA copolymer from 50 to 150 nm; and (A-1b) at least one graft copolymer (A-1b) having an average particle size $d_{50}$ of the rubber particles in the ASA copolymer from 200 to 750 nm, wherein the constituents (A-1) to (A-3) sum up to 100 wt.-% of the thermoplastic molding composition (A).

In a further embodiment, the invention relates to a molding composition (P) as previously defined, wherein a high gloss surface area on a molded article (T) produced from said molding composition (P) that exhibits a gloss level above 75 gloss units before any weathering exposure, keeps a gloss level of above 75% of the gloss level before weathering after being subjected to artificial weathering according to ISO 4892-2A for 2400 h, wherein the gloss level is determined according to DIN EN ISO 2813 at a measuring angle of 60°.

In a further embodiment, the invention relates to a molding composition (P) as previously defined, wherein a high gloss surface area on a molded article (T) produced from said molding composition (P) that exhibits a gloss level above 75 gloss units before any weathering exposure exhibits a color shift dE as measured in reference to the unexposed surface of below dE=6 after being subjected to artificial weathering according to ISO 4892-2A (e.g. 2013) for 2400 h, wherein the gloss level is determined according to DIN EN ISO 2813 at a measuring angle of 60°.

In a further aspect, the invention relates to a method for producing the molding composition (P) previously described, the method comprising at least the following steps:

(i) providing the components (A) to (E) in the predetermined amounts to a mixing device; and (ii) blending the components (A) to (E) in the mixing device at temperatures above the glass transition point of the components (A) to obtain the molding composition (P).

In a further aspect, the invention relates to a method for reducing mold deposit formation upon the molding of high gloss surface molded articles (T) with gloss levels above 75 gloss units on at least a part of the surface area of the molded article (T), wherein the gloss level is determined according to DIN EN ISO 2813 at a measuring angle of 60°, wherein said method comprises the step of compounding the constituents (A) to (E) as previously described and wherein the reduction of mold deposit formation is observed as followed:

reduction of the extent of formation of mold deposit during production of molded high gloss parts as assessed by visual inspection of the deposit formation on the mold in the vicinity of a weld line after production of 500 injection molded test specimens produced from the molding composition (P) in comparison to the extent of mold deposit formation from a comparative molding composition (P') molded and assessed with same conditions, wherein the comparative molding composition (P') is obtained by compounding the components (A) to (E) contained in the molding composition (P) as previously described and additionally at least 0.1 wt.-%, based on the total weight of the molding composition (P') of at least one oligomeric and/or polymeric components comprising ethylene repeating units and/or propylene repeating units.

In a further aspect, the invention relates to a molded article (T) comprising high gloss surface areas with gloss levels above 75 gloss units prepared from a thermoplastic molding composition (P) as previously described, wherein the gloss level is determined according to DIN EN ISO 2813 at a measuring angle of 60°.

In a further aspect, the invention relates to the use of a molded article (T) with preferably high gloss surface areas with gloss levels above 75 gloss units prepared from a thermoplastic molding composition (P) as previously described, in unpainted exterior, preferably automotive applications, wherein the gloss level is determined according to DIN EN ISO 2813 at a measuring angle of 60°.

Graft Copolymer (Component A-1)

The molding composition (P) according to the present invention comprises (or consists of) at least one thermoplastic polymer composition (A) comprising at least one graft copolymer (A-1), and at least one at least one thermoplastic matrix (A-2) based on one or more vinylaromatic copolymers.

In a preferred embodiment, the graft copolymer (A-1) is a rubber-modified copolymer comprising repeating units of acrylonitrile and styrene. In a preferred embodiment, copolymers of acrylonitrile and styrene which are graft-polymerized on rubber particles derived from polymerizing a monomer composition comprising at least one conjugated diene monomer or at least one acrylate monomer are used.

In a further preferred embodiment, the at least one graft copolymer (A-1) used comprises (or consists of):

A-1.1: from 20 to 90 wt.-%, preferably from 40 to 90 wt.-%, particularly preferably from 45 to 85 wt.-%, very particularly preferably from 50 to 80 wt.-%, based on the total weight of the graft copolymer (A-1), of a graft base of one or more monomers consisting of:

A-1.11: 65 to 100 wt.-% or 65 to 99.99 wt.-%, preferably 75 to 99.99 wt.-%, particularly preferably 80 to 99.98 wt.-%, based on the total weight of the graft base (A-1.1), of at least one C1 to C8 alkyl(meth) acrylate, in particular n-butyl acrylate and/or 2-ethylhexyl acrylate, A-1.12: 0 to 35 wt.-%, preferably 0 to 25 wt.-%, particularly preferably 0 to 20 wt.-%, based on the total weight of the graft base (A-1.1), of at least one further comonomer selected from: styrene, alpha-methyl styrene, acrylonitrile, methacrylonitrile, methyl methacrylate, maleic acid anhydride and N-phenylmaleimide, preferably styrene and alpha-methyl styrene, particularly preferably styrene;

A-1.13: from 0 to 10 wt.-% or 0.01 to 10 wt.-%, preferably from 0.01 to 5, particularly preferably from 0.02 to 2 wt.-%, based on the total weight of the graft base (A-1.1), of one or more polyfunctional crosslinking monomers, selected from allyl(meth) acrylate, divinylbenzene, diallylmaleate, diallylfumarate, diallylphthalate, triallylcyanurat, triallylisocyanurat and dihydrodicyclopentadienyl acrylate (DCPA), which, when component A-1.11 is acrylate, is present in amounts of at least 0.1 wt.-%;

A-1.2: from 10 to 80 wt.-%, preferably from 10 to 60 wt.-%, more preferably from 15 to 55 wt.-%, very particularly preferably from 20 to 50 wt.-%, based on the total weight of the graft copolymer (A-1), of at least one graft layer of one or more monomers consisting of:

A-1.21: from 65 to 95 wt.-%, preferably from 70 to 90 wt.-%, particularly preferably from 75 to 85 wt.-%, based on the total weight of the graft layer (A-1.2), of at least one vinylaromatic monomer, preferably styrene and/or alpha-methyl styrene, in particular styrene;

A-1.22: 5 to 35 wt.-%, preferably 10 to 30 wt.-%, particularly preferably 15 to 25 wt.-%, based on the total weight of the graft layer (A-1.2), of acrylonitrile and/or methacrylonitrile, preferably acrylonitrile; and A-1.3: 0 to 30 wt.-%, preferably 0 to 20 wt.-%, particularly preferably 0 to 15 wt.-%, based on the total weight of the graft copolymer (A-1), of at least one further constituent selected from:

at least one monoethylenically unsaturated monomer selected from: methyl methacrylate, maleic acid anhydride and N-phenylmaleimide, preferably methyl methacrylate and/or at least one molecular weight regulator, in particular a thiol-based molecular weight regulator such as tert-dodecylmercaptan.

Particular preferred polyfunctional crosslinking monomers A-1.13 are allyl(meth)acrylate (AMA) and/or dihydrodicyclopentadienyl acrylate (DCPA), and more preferred DCPA.

Preferably, the graft copolymer (A-1) is typically prepared in an emulsion polymerization process or a suspension polymerization process. The graft base A-1.1, comprising (or consisting of) monomers A-1.11, A-1.12 and optionally A-1.13, as well as its preparation is known and described in the literature, e.g. DE-A 28 26 925, DE-A 31 49 358 and DE-A 34 14 118.

The graft polymerization reaction used to synthesize the graft shell A-1.2 may be conveniently done in the same vessel as the emulsion polymerization done for the synthesis of the graft base A-1.1. During the reaction, additives, like emulsifiers, pH buffers and initiators can be added. The monomers of the graft shell, especially monomers A-1.21 and A-1.22, can be added at once to the reaction mixture or stepwise in several steps, preferably in a continuous way, added during polymerization. When monomers A-1.21 and/or A-1.22 are added in several steps typically a multi-layered graft shell A-1.2 is obtained.

Suitable emulsifiers, buffers and initiators are described in WO 2015/150223 and WO 2015/078751.

In a preferred embodiment, the styrene-based graft copolymer (A-1) is acrylonitrile styrene acrylate (ASA) and mixtures thereof.

In a more preferred embodiment, the graft copolymer (A-1) according to the invention is particularly preferably an ASA copolymer comprising (or consisting of):

A-1.1: from 40 to 90 wt.-%, based on the total weight of the styrene-based graft copolymer (A-1), of a graft base consisting of:

A-1.11: from 65 to 99.9 wt.-%, preferably from 90 to 99.5 wt.-%, based on the total weight of the graft base (A-1.1), of at least one C1 to C8 alkyl(meth) acrylate, preferably n-butyl acrylate and/or 2ethylhexylacrylate, in particular n-butyl acrylate, A-1.12: 0 to 35 wt.-%, preferably 1 to 10 wt.-%, based on the total weight of the graft base (A-1.1), of styrene, A-1.13: 0.1 to 5 wt.-%, preferably 0.5 to 5 wt.-%, in particular 0.5 to 3 wt.-%, most preferred 1 to 2.5 wt.-%, based on the total weight of the graft base (A-1.1), of at least one polyfunctional cross-linking monomer, selected from allyl(meth)acrylate, divinylbenzene, diallylmaleate, diallylfumarate, diallylphthalate, triallylcyanurat, triallylisocyanurat and dihydrodicyclopentadienyl acrylate (DCPA), preferably selected from allyl(meth)acrylate and DCPA, in particular DCPA, and A-1.2: from 10 to 60 wt.-%, based on the total weight of the styrene-based graft copolymer (A-1), of a graft comprising (or consisting of):

A-1.21: from 65 to 95 wt.-%, based on the total weight of the graft layer (A-1.2), of styrene;

A-1.22: 5 to 35 wt.-%, based on the total weight of the graft layer (A-1.2), of acrylonitrile and A-1.3: 0 to 30 wt.-%, based on the total weight of the styrene-based graft copolymer (A-1), methyl methacrylate (MMA).

In a preferred embodiment, the at least one graft copolymer (A-1) is or comprises an acrylonitrile styrene acrylate (ASA) having an average particle size $d_{50}$ of the rubber particles in the ASA copolymer from 50 to 1000 nm, preferably from 60 to 600 nm, wherein the average particle size is determined by scattered light measurement.

Typically the mean particle diameter can be measured by scattered light measurement, i.e., determined by turbidity (Lange, Kolloid-Zeitschrift und Zeitschrift für Polymere, 1968, 223(1):24-30), or by ultracentrifugation (e.g. described in Scholtan and Lange, Kolloid-Zeitschrift und Zeitschrift für Polymere, 1972, 250(8): 782-796), or using Hydrodynamic Chromatography HDC (e.g. described in W. Wohlleben, H. Schuch, "Measurement of Particle Size Distribution of Polymer Latexes", 2010, Editors: L. Gugliotta, J. Vega, p. 129-153).

In one preferred embodiment, the graft copolymer (A-1) comprises a binary or trinary size distribution comprising (or consisting of)

(A-1a) at least one graft copolymer (A-1a) having an average particle size $d_{50}$ of the rubber particles in the ASA copolymer from 50 to 150 nm; and (A-1b) at least one graft copolymer (A-1b) having an average particle size $d_{50}$ of the rubber particles in the ASA copolymer from 200 to 750 nm.

In a further preferred embodiment, the graft copolymer (A-1) comprises a binary or trinary size distribution comprising (or consisting of)

(A-1a) at least one graft copolymer (A-1a) having an average particle size $d_{50}$ of the rubber particles in the ASA copolymer from 50 to 150 nm or 70 to 100 nm; and (A-1b) at least one graft copolymer (A-1b) having an average particle size $d_{50}$ of the rubber particles in the ASA copolymer from 200 to 750 nm or 400 to 600 nm.

In a preferred embodiment, a first basic rubber latex (L1) may be obtained from (co)polymerizing butyl acrylate and one or more crosslinking agents (e.g., tricyclodecenyl acrylate) in an aqueous solution that may comprise further ingredients such as, e.g., one or more salts (e.g., C12- to C18-paraffin sulfonic acid and/or sodium bicarbonate). The temperature of the reaction may be, for example, in the range of from 55 to 70° C. In a preferred embodiment, a mass ratio of butyl acrylate: tricyclodecenyl acrylate in the range of from 10:1 to 100:1, preferably of from 40:1 to 80:1, is used for polymerization. The mass ratios and definitions of the components are preferably as described herein. More specific examples are also provided in the experimental section below.

In a preferred embodiment, a first graft rubber latex (component A-1a) may be obtained from (co)polymerizing a basic rubber latex (e.g., a first basic rubber latex L1 obtainable as described before) with styrene and acrylonitrile in an aqueous solution that may comprise further ingredients such as, e.g., one or more salts (e.g., sodium persulfate). The reaction temperature may be in the range of from 50 to 80° C. Optionally, the obtained graft latex may be coagulated. Coagulation may be achieved in a salt solution (e.g., a magnesium sulfate solution) at a temperature in the range of from 50 to 80° C. Coagulation may optionally be followed by sintering (e.g., at a temperature in the range of from 80 to 150° C.). The mass ratios and definitions of the components are preferably as described herein. More specific examples are also provided in the experimental section below.

In a preferred embodiment, a second basic rubber latex (L2) may be obtained from (co)polymerizing butyl acrylate and one or more crosslinking agents (e.g., tricyclodecenyl acrylate) in the presence of a first basic rubber latex such as that described as L1 above in an aqueous solution that may comprise further ingredients such as, e.g., one or more salts (e.g., sodium bicarbonate, sodium persulfate and/or C12- to C18-paraffin sulfonic acid). The temperature of the reaction may be, for example, in the range of from 55 to 70° C. In a preferred embodiment, a mass ratio of butyl acrylate: tricyclodecenyl acrylate in the range of from 10:1 to 100:1, preferably of from 40:1 to 80:1, is used for polymerization. The mass ratios and definitions of the components are preferably as described herein. More specific examples are also provided in the experimental section below.

In a preferred embodiment, a second graft rubber latex (component A-1b) may be obtained from (co)polymerizing a basic rubber latex (e.g., a second basic rubber latex L2 obtainable as described before) with styrene and acrylonitrile in an aqueous solution that may comprise further ingredients such as, e.g., one or more salts (e.g., sodium persulfate). The reaction temperature may be in the range of from 50 to 80° C. Optionally, the obtained graft latex may be coagulated. Coagulation may be achieved in a salt solution (e.g., a magnesium sulfate solution) at a temperature in the range of from 70 to 99° C. Coagulation may optionally be followed by sintering (e.g., at a temperature in the range of from 80 to 150° C.). The mass ratios and definitions of the components are preferably as described herein. More specific examples are also provided in the experimental section below.

Thermoplastic Matrix (Component A-2)

In a preferred embodiment, the at least one thermoplastic matrix (A-2) comprises a copolymer which contains at least one vinyl cyanide repeating unit and at least one vinylaromatic repeating unit. In a preferred embodiment, throughout the present invention, the vinyl cyanide repeating unit is derived from acrylonitrile. In a preferred embodiment, throughout the present invention, the vinylaromatic repeating unit is derived from styrene, alpha-methylstyrene or a combination thereof.

In a more preferred embodiment, the at least one thermoplastic matrix (A-2) comprises a copolymer which contains acrylonitrile repeating units and at least one vinylaromatic repeating unit selected from styrene, alpha-methylstyrene and a combination thereof, in particular styrene. A copolymer that comprises or consists of acrylonitrile and styrene may also be designated as poly(styrene-acrylonitrile) (SAN). A copolymer that comprises or consists of acrylonitrile and alpha-methylstyrene may also be designated as poly(alpha-methyl styrene/acrylonitrile) (AMSAN).

Poly(styrene-acrylonitrile) (SAN) and/or poly(alpha-methyl styrene/acrylonitrile) (AMSAN) copolymers may be used as thermoplastic polymer (A-2). In general, any SAN and/or AMSAN copolymer known in in the art may be used within the subject-matter of the present invention.

In a preferred embodiment, the at least one thermoplastic polymer composition (A) comprises at least one copolymer (A-2) comprising (or consisting of):

18 to 45 wt.-% based on the total weight of (A-2), of at least one vinyl cyanide repeating unit, in particular acrylonitrile; and 55 to 82 wt.-% based on the total weight of (A-2), of at least one vinylaromatic repeating unit, in particular a vinylaromatic repeating unit derived from styrene and/or alpha-methylstyrene.

In a preferred embodiment, the SAN and AMSAN copolymers of the present invention contain:

from 50 to 99 wt.-%, based on the total weight of the SAN and/or AMSAN copolymer, of at least one member selected from the group consisting of styrene and alpha-methyl styrene; and from 1 to 50 wt.-%, based on the total weight of the SAN and/or AMSAN copolymer, of acrylonitrile.

The weight average molecular weight (as determined by gel permeation chromatography relative to polystyrene as standard) of the SAN or AMSAN copolymer may be in the range of 15,000 to 200,000 g/mol, preferably in the range of 30,000 to 150,000 g/mol.

In a preferred embodiment, the ratios by weight of the components making up the SAN or AMSAN copolymer are 60 to 95 wt.-%, based on the total weight of the SAN and/or AMSAN copolymer, of styrene and/or alpha-methyl styrene, and 40 to 5 wt.-%, based on the total weight of the SAN and/or AMSAN copolymer, of acrylonitrile.

In a preferred embodiment, SAN or AMSAN containing proportions of incorporated acrylonitrile monomer units of <36 wt.-%, based on the total weight of the SAN and/or AMSAN copolymer may be used.

In a preferred embodiment, copolymers of styrene with acrylonitrile of the SAN or AMSAN type incorporating comparatively little acrylonitrile (not more than 35 wt.-%, based on the total weight of the SAN and/or AMSAN copolymer) are used.

Among the afore-mentioned, most preferred SAN or AMSAN copolymers are those having a viscosity number VN (determined according to DIN 53726 at 25° C., 0.5% by weight in dimethylformamide) of from 50 to 120 ml/g are in particular preferred.

As used herein, as far as not otherwise defined, all measurement norms such as, e.g., DIN norms and PV norms, preferably refer to the version that was up-to-date in August 2019.

The copolymers of SAN or AMSAN component are known and the methods for their preparation, for instance, by radical polymerization, more particularly by emulsion, suspension, solution and bulk polymerization are also well documented in the literature.

Thermoplastic Polymer Composition (A)

In a preferred embodiment, the at least one thermoplastic polymer composition (A) comprises (or consists of):

(A-1) 5 to 50 wt.-%, based on the total weight of the thermoplastic polymer composition (A), of at least one graft copolymer (A-1) comprising or consisting of an acrylonitrile styrene acrylate (ASA) copolymer having an average particle size $d_{50}$ of the rubber particles in the ASA copolymer from 50 to 1000 nm, wherein the average particle size is determined by scattered light measurement;

(A-2) 20 to 95 wt.-%, based on the total weight of the thermoplastic polymer composition (A), of at least one thermoplastic matrix (A-2) comprising 18 to 45 wt.-% of at least one vinyl cyanide repeating unit, in particular acrylonitrile, and 55 to 82 wt.-% of at least one vinylaromatic repeating unit, in particular an vinylaromatic repeating unit derived from styrene and/or alpha-methylstyrene; and (A-3) 0 to 75 wt.-%, based on the total weight of the thermoplastic polymer composition (A), of one or more additional thermoplastic polymers (A-3), in particular one or more additional thermoplastic polymers (A-3) selected from the group consisting of polycarbonate (PC), polyamide (PA), and mixtures thereof, wherein components (A-1), (A-2) and (A-3) sum up to 100 wt.-% of the thermoplastic polymer composition (A).

In another preferred embodiment, the at least one thermoplastic polymer composition (A) comprises 5 to 50 wt.-%, preferably 7 to 50 wt.-%, in particular 10 to 45 wt.-%, based on the total weight of thermoplastic polymer composition (A), of at least one styrene-based graft copolymer (A-1) and 0 to 95 wt.-%, preferably 20 to 93 wt.-%, in particular 45 to 90 wt.-%, based on the total weight of thermoplastic polymer composition (A), of at least one thermoplastic matrix (A-2) selected from poly(styrene-acrylonitrile) (SAN), poly(alpha-methyl styrene-acrylonitrile) (AMSAN) and mixtures thereof. The remainder of the thermoplastic polymer composition (A) is optionally composed of one or more additional thermoplastic polymers (A-3), in particular one or more additional thermoplastic polymers (A-3) selected from the group consisting of polycarbonate (PC), polyamide (PA), and mixtures thereof.

In another preferred embodiment, the at least one thermoplastic polymer composition (A) comprises 20 to 50 wt.-%, preferably 30 to 40 wt.-%, based on the total weight of thermoplastic polymer composition (A), of at least one styrene-based graft copolymer (A-1) and 40 to 80 wt.-%, preferably 60 to 70 wt.-%, based on the total weight of thermoplastic polymer composition (A), of at least one thermoplastic matrix (A-2) selected from poly(styrene-acrylonitrile) (SAN), poly(alpha-methyl styrene-acrylonitrile) (AMSAN) and mixtures thereof. The remainder of the thermoplastic polymer composition (A) is optionally composed of one or more additional thermoplastic polymers (A-3), in particular one or more additional thermoplastic polymers (A-3) selected from the group consisting of polycarbonate (PC), polyamide (PA), and mixtures thereof.

In another preferred embodiment, the at least one thermoplastic polymer composition (A) comprises 5 to 50 wt.-%, preferably 20 to 40 wt.-%, based on the total weight of thermoplastic polymer composition (A), of at least one styrene-based graft copolymer (A-1) and 40 to 80 wt.-%, preferably 60 to 70 wt.-%, based on the total weight of thermoplastic polymer composition (A), of a thermoplastic matrix (A-2) comprising 40 to 60 wt.-% of SAN and 60 to 40 wt.-% AMSAN, preferably 45 to 55 wt.-% of SAN and 55 to 45 wt.-% AMSAN, based on the total weight of the thermoplastic matrix (A-2). The remainder of the thermoplastic polymer composition (A) is optionally composed of one or more additional thermoplastic polymers (A-3), in particular one or more additional thermoplastic polymers (A-3) selected from the group consisting of polycarbonate (PC), polyamide (PA), and mixtures thereof.

In another preferred embodiment, the at least one thermoplastic polymer composition (A) comprises from 5 to 50 wt.-%, based on the total weight of thermoplastic polymer composition (A), of at least one constituent A-1; from 5 to 80 wt.-% based on the total weight of thermoplastic polymer composition (A), of at least one constituent A-2, selected from poly(styrene-acrylonitrile) (SAN), poly(alpha-methyl styrene-acrylonitrile) (AMSAN), and mixtures thereof; and from 0 to 75 wt.-%, in particular from 40 to 55 wt.-%, based on the total weight of the thermoplastic polymer composition (A), of a further polymer component (A-3), selected from polycarbonate (PC), polyamide (PA) and mixtures thereof. In particular, component (A-3) is one or more polycarbonates (PC).

In a preferred embodiment, the at least one thermoplastic polymer composition (A) comprises 0 to 75 wt.-%, from 10 to 70 wt.-%, from 20 to 65 wt.-%, from 30 to 60 wt.-%, or from 40 to 55 wt.-%, based on the total weight of the polymer composition (A), of a further polymer component (A-3).

In a preferred embodiment, the at least one thermoplastic polymer composition (A) comprises 0 to 75 wt.-%, from 10 to 70 wt.-%, from 20 to 65 wt.-%, from 30 to 60 wt.-%, or from 40 to 55 wt.-%, based on the total weight of a further polymer component (A-3), wherein A-3 is selected from polycarbonate (PC), polyamide (PA) and mixtures thereof, in particular wherein A-3 is one or more polycarbonates (PC).

In another preferred embodiment, the at least one thermoplastic polymer composition (A) comprises (or consists of):

(A-1) 5 to 50 wt.-%, more preferably 20 to 40 wt.-%, based on the total weight of the thermoplastic polymer composition (A), of at least one graft copolymer (A-1); and (A-2) 20 to 65 wt.-%, more preferably 25 to 40 wt.-%, based on the total weight of the thermoplastic polymer composition (A), of at least one thermoplastic matrix (A-2) comprising at least one vinyl cyanide repeating unit and at least one vinylaromatic repeating unit, and, (A-3) 30 to 75 wt.-%, more preferably 40 to 55 wt.-%, based on the total weight of the thermoplastic polymer composition (A), of one or more additional thermoplastic polymers (A-3), in particular one or more polycarbonate polymers.

In another preferred embodiment, the at least one thermoplastic polymer composition (A) comprises (or consists of):

(A-1) 5 to 50 wt.-%, more preferably 20 to 40 wt.-%, based on the total weight of the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 65 wt.-%, more preferably 25 to 40 wt.-%, based on the total weight of the thermoplastic polymer composition (A), of at least one thermoplastic matrix (A-2) comprising 18 to 45 wt.-% of at least one vinyl cyanide repeating unit and 55 to 82 wt.-% of at least one vinylaromatic repeating unit, and, (A-3) 30 to 75 wt.-%, more preferably 40 to 55 wt.-%, based on the total weight of the thermoplastic polymer composition (A), of one or more additional thermoplastic polymers (A-3), in particular one or more polycarbonate polymers.

In another preferred embodiment, the at least one thermoplastic polymer composition (A) comprises (or consists of):

(A-1) 5 to 50 wt.-%, more preferably 20 to 40 wt.-%, based on the total weight of the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 95 wt.-%, more preferably 25 to 40 wt.-%, based on the total weight of the thermoplastic polymer composition (A), of at least one thermoplastic matrix (A-2) comprising 18 to 45 wt.-% of at least one vinyl cyanide repeating unit, in particular acrylonitrile, and 55 to 82 wt.-% of at least one vinylaromatic repeating unit, in particular a vinylaromatic repeating unit derived from styrene and/or alpha-methylstyrene, and, (A-3) 0 to 75 wt.-%, preferably 30 to 75%, more preferably 40 to 55 wt.-%, based on the total weight of the thermoplastic polymer composition (A), of one or more additional thermoplastic polymers (A-3), in particular one or more additional thermoplastic polymers (A-3) selected from the group consisting of polycarbonate (PC), polyamide (PA), and mixtures thereof, in particular one or more polycarbonate polymers.

Additional Thermoplastic Polymers (A-3)

The thermoplastic polymer composition (A) may optionally comprise one or more additional thermoplastic polymers (A-3), which are preferably selected from the group consisting of polycarbonate (PC), polyamide (PA), and mixtures thereof.

Polycarbonate Component

Any polycarbonate may be used as polycarbonate component in the scope of the present invention. Polycarbonate includes one or more, preferably one or two, more preferably one aromatic polycarbonate. Aromatic polycarbonate includes for example polycondensation products, for example aromatic polycarbonates, aromatic polyester carbonates.

Aromatic polycarbonates and/or aromatic polyester carbonates which are suitable according to the invention are known from the literature or may be prepared by processes known from the literature (for the preparation of aromatic polycarbonates see, for example, DE-B 1 495 626, DE-A 2 232 877, DE-A 2 703 376, DE-A 2 714 544, DE-A 3 000 610 and DE-A 3 832 396). The preparation of aromatic polycarbonates may be carried out, e.g., by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols.

A preparation via a melt polymerization process by reaction of diphenols with, for example, diphenyl carbonate is also possible.

Diphenols for the preparation of the aromatic polycarbonates and/or aromatic polyester carbonates are preferably those of the formula (IV)

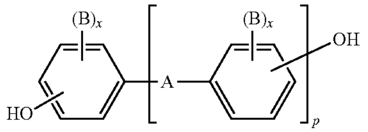

(IV)

wherein A is a single bond, $C_1$ to $C_5$-alkylene, $C_2$ to $C_5$-alkylidene, $C_5$ to $C_6$-cycloalkylidene, —O—, —SO—, —CO—, —S—, —$SO_2$—, $C_6$ to $C_{12}$-arylene, on to which further aromatic rings optionally containing heteroatoms may be fused, or a radical of the formula (V) or (VI),

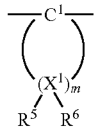

(V)

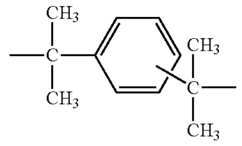

(VI)

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R^6$ individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-bis-(4-hydroxyphenyl)-propane (bisphenol A) is particularly preferred. The diphenols may be employed individually or as any desired mixtures. The diphenols are known from the literature or obtainable by processes known from the literature.

Chain terminators which are suitable for the preparation of the thermoplastic, aromatic polycarbonates may be, for example, phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed may be in general between 0.5 mol % and 10 mol %, based on the sum of the moles of the particular diphenols employed.

In a preferred embodiment, polycarbonates in the sense of the present invention are thermoplastic, aromatic polycarbonates having an average weight-average molecular weights ($M_w$, measured e.g. by means of an ultracentrifuge or by scattered light measurement) of from 10,000 to 200,000 g/mol, preferably 15,000 to 80,000 g/mol, particularly preferably 24,000 to 32,000 g/mol.

The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups. Both homopolycarbonates and copolycarbonates are suitable.

The aromatic polyester carbonates may be either linear or branched in a known manner (in this context see DE-A 2 940 024 and DE-A 3 007 934). Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-di hydroxyphenyl)-propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.).

The thermoplastic, aromatic polycarbonates and polyester carbonates may be employed by themselves or in any desired mixture of one or more, preferably one to three or one or two thereof. Most preferably only one type of polycarbonate is used. Preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched due to the presence of branching sites.

Polyamide Component

Any polyamide may be used as polyamide component in the scope of the present invention. Examples for suitable polyamides are known homopolyamides, co-polyamides and mixtures of such polyamides. They may be semi-crystalline and/or amorphous polyamides. Suitable semi-crystalline polyamides are polyamide-6, polyamide-6,6, mixtures and corresponding copolymers of those components. Also included are semicrystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylenediamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylene-diamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as caminocaproic acid, ω-aminoundecanoic acid or ω-aminolauric acid or their lactams. Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine. Instead of pure 4,4'-diaminodicyclohexylmethane it is also possible to use mixtures of the position-isomeric diaminodicyclohexylmethanes, which are composed of from 70 to 99 mol % of the 4,4'-diamino isomer, from 1 to 30 mol % of the 2,4'-diamino isomer, from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

Hindered Amine Light Stabilizing Composition (Component C)

According to the present invention, the molding composition (P) at least one hindered amine light stabilizing composition (B) comprising:

(B-1) 0.2 to 0.9 wt.-%, preferably 0.3 to 0.9 wt.-%, more preferably 0.4 to 0.9 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties at one of the 3, 4 or 5 positions of the piperidine structures wherein the at least one hindered amine light stabilizer having a dipiperidine structure has a molecular weight of 200-550 g/mol, (B-2) 0.1 to 0.9 wt.-%, preferably 0.15 to 0.6 wt.-%, more preferably 0.2 to 0.4 wt.-%, based on the total weight of the molding composition (P), of a hindered amine light stabilizer mixture having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures, and (B-3) 0 to 2 wt.-%, preferably 0.1 to 2 wt.-%, more preferably 0.2 to 2 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, preferably of 1500-4000 g/mol, more preferably 2000-4000 g/mol.

Suitable hindered amine light stabilizers are substances including piperidine structures with at least one alkyl group at each of the 2 and 6 positions of the piperidine structures. Particular preferred are compounds having piperidine structures with two alkyl groups at each of the 2 and 6 positions. In a more preferred embodiment, the alkyl groups are selected from C1-C5 alkyl groups, in particular C1-03 alkyl groups.

The hindered amine light stabilizer (B-1) of the molding composition (P) in accordance with the present invention is at least one compound having a dipiperidine structure with at least one alkyl group at each of the 2 and 6 positions of the dipiperidine structure and not containing any saturated or unsaturated C12-C21 ester moieties at one of the 3, 4 or 5 positions of the piperidine structures wherein the at least one hindered amine light stabilizer having a dipiperidine structure has a molecular weight of 200-550 g/mol. Suitable hindered amine light stabilizer (B-1) comprise compounds comprising two piperidine structures which are connected via C3-C11-saturated or -unsaturated diester moieties which are bound to one of the 3, 4 or 5 position of the piperidine structures.

In a further preferred embodiment, the hindered amine light stabilizer (B-1) comprise compounds comprising two piperidine structures which are connected via C3-C11saturated diester moieties, in particular C6-C10-saturated diester moieties, which are bound to one of the 3, 4 or 5 position of the piperidine structures. and not containing any saturated or unsaturated C12-C21 ester moieties at one of the 3, 4 or 5 positions of the piperidine structures.

A particular preferred hindered amine light stabilizer having a dipiperidine structure suitable to be used as component (B-1) according to the present invention is represented by the chemical formula (I):

(I)

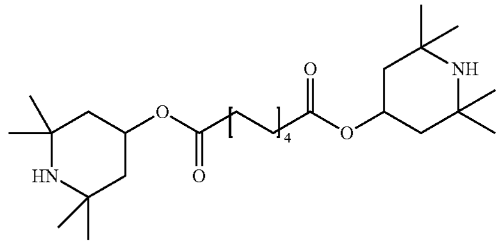

This sterically hindered amine (bis(2,2,6,6-tetramethylpiperidin-4-yl) sebacate, CAS number 52829-07-9) and production thereof are known to the person skilled in the art and are described in the literature (see by way of example U.S. Pat. No. 4,396,769 and the references cited therein). It is marketed as Tinuvin® 770 by BASF SE and has a molecular weight of 481 g/mol.

Other suitable examples for component (B-1) are: bis(1,2,2,6,6-pentamethyl-4-piperidyl) sebacate (CAS 41556-26-7, Tinuvin® 765 by BASF SE, molecular weight (MW)=509 g/mol); N, N'-bisformyl-N, N'-bis-(2,2,6,6-tetramethyl-4-piperidinyl)-hexamethylendiamine (CAS 124172-53-8, Uvinul® 4050 H by BASF SE, MW=450 g/mol); N,N'-bis(2,2,6,6-tetramethyl-4-piperidyl)isophthalamide (CAS 42774-15-2, Nylostab® S-EED® by Clariant, MW=443 g/mol).

The hindered amine light stabilizer (B-2) of the molding composition (P) in accordance with the present invention is at least one compound having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures. Such hindered amine stabilizers can be present as mixture of substances with different fatty acid chains. Preferably, the ester moieties comprise or consist of saturated ester moieties. Even more preferably, the ester moieties comprise or consist of C15-C20-saturated ester moieties at at least one of the 3, 4 or 5 positions of the monopiperidine structures, in particular at least at the 4 position.

A particular preferred hindered amine light stabilizer having a monopiperidine structure suitable to be used as component (B-2) according to the present invention is represented by the chemical formula (II):

(II)

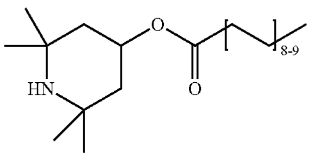

This sterically hindered amine (2,2,6,6-tetramethyl-4-piperidinyl stearate, CAS number 167078-06-0, or 86403-32-9, or 24860-22-8) and production thereof are known to the person skilled in the art and described in the literature (Carlsson et al., Can. Journal of Polymer Science, Polymer Chemistry Edition (1982), 20(2), 575-82). It is marketed as Cyasorb® UV-3853 by the company Solvay. This substance with a molecular weight below 516 g/mol is a waxy and sticky product with melting temperature at around 30° C. As dosage in pure solid form in compounding of thermoplastic compositions represents a technical hurdle this product is usually supplied and used as master batch. In a preferred embodiment the substance is thus added in form of a master batch comprising 20 to 70 wt.-%, preferably 40 to 60 wt.-%, based on the total weight of the master batch, of 2,2,6,6-tetramethyl-4-piperidinyl stearate and a copolymer of a vinylaromatic olefin and acrylonitrile as matrix polymer. Preferably, the matrix polymer is selected from poly(styrene-acrylonitrile) (SAN), poly(alpha-methyl styrene/acrylonitrile) (AMSAN), and/or poly(styrene-methyl methacrylate) (SMMA).

The hindered amine light stabilizer (B-3) of the molding composition (P) in accordance with the present invention is at least one compound having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups. The hindered amine light stabilizer (B-3) having a polymeric structure is defined as a compound comprising at least two, preferably at least three, repeating units derivable from polymerizable monomers and having a molecular weight of 1000-4000 g/mol, preferably of 1500-4000 g/mol, more preferably 2000-4000 g/mol.

A particular preferred hindered amine light stabilizer having a polymeric structure comprising piperidine groups suitable to be used as component (B-3) according to the present invention is represented by the chemical formula (III):

(III)

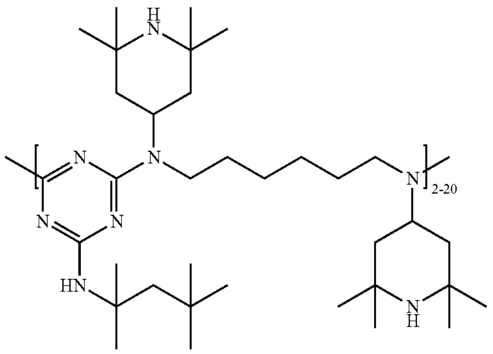

This sterically hindered amine (CAS number 71878-19-8) and production thereof are known to the person skilled in the art and are described in the literature (see by way of example EP-A-93 693 and the references cited therein). It is marketed as Chimassorb® 944 by BASF SE with a molecular weight of 2100-3000 g/mol.

Other suitable examples for component (B-3) are: 1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS 192268-64-7, Chimassorb® 2020 by BASF SE, MW=2600-3400 g/mol); Butanedioic acid, dimethylester, polymer with 4-hydroxy-2,2,6,6-tetramethyl-1-piperidine ethanol (CAS 65447-77-0, Tinuvin® 622 by BASF SE, MW=3100-4000 g/mol); Alkenes, C20-24 alpha-, polymers with maleic anhydride, reaction products with 2,2,6,6-tetramethyl-4-piperidinamine (CAS 152261-33-1, Uvinul® 5050 H by BASF SE, MW=3000-4000 g/mol); 1,3,5-Triazine-2,4,6-triamine, N2,N2"-1,2-ethanediylbis[N2-[3-[[4,6-bis[butyl(1,2,2,6,6-pentamethyl-4-piperidinyl)amino]-1,3,5-triazin-2-yl]amino]propyl]-N',N"-dibutyl-N', N"-bis(1,2,2,6,6-pentamethyl-4-piperidinyl)-(CAS 106990-43-6, Sabostab® UV 119 by SABO S.p.A., MW=2286 g/mol); Poly [(6-morpholino-s-triazine-2,4-diyl)[2,2,6,6-tetramethyl-4-piperidyl)imino]-hexamethylene [(2,2,6,6-tetramethyl-4-piperidyl)imino]] (CAS 82451-48-7 or 90751-07-8, Cyasorb® UV-3346 by Solvay, MW=1600 g/mol); 1,6-Hexanediamine,N,N'-bis(2,2,6,6-tetramethyl-4-piperidinyl)-polymers with morpholine-2,4,6-trichloro1,3,5-triazine (CAS 193098-40-7 or 219920-30-6, Cyasorb® UV-3529 by Solvay).

The hindered amine light stabilizer (B-1) is present in the molding composition in an amount of 0.2 to 0.9 wt.-%, preferably 0.3 to 0.9 wt.-%, more preferably 0.4 to 0.9 wt.-%, in particular 0.4 to 0.6 wt.-%, based on the total weight of the molding composition (P).

The hindered amine light stabilizer (B-2) is present in the molding composition in an amount of 0.1 to 0.9 wt.-%, preferably 0.15 to 0.6 wt.-%, more preferably 0.2 to 0.5 wt.-%, in particular 0.2 to 0.4 wt.-%, based on the total weight of the molding composition (P).

The hindered amine light stabilizer (B-3) is optionally present in the molding composition in an amount of 0 to 2.0 wt.-%, preferably 0.1 to 2.0 wt.-%, more preferably 0.2 to 2.0 wt.-%, in particular 0.2 to 1.0 wt.-%, based on the total weight of the molding composition (P), In one embodiment of the invention, the molding composition (P) comprises at least one hindered amine light stabilizing composition (B) comprising:

(B-1) 0.2 to 0.9 wt.-%, preferably 0.3 to 0.9 wt.-%, more preferably 0.4 to 0.9 wt.-%, based on the total weight of the molding composition (P), of a compound represented by the chemical formula (I):

(I)

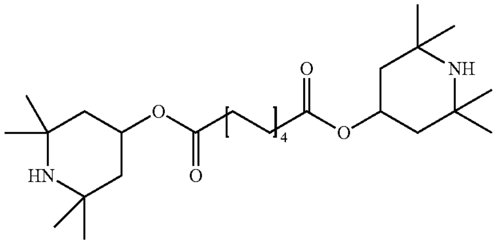

(B-2) 0.1 to 0.9 wt.-%, preferably 0.15 to 0.6 wt.-%, more preferably 0.2 to 0.4 wt.-%, based on the total weight of the molding composition (P), of a composition comprising at least one compound represented by the chemical formula (II):

(II)

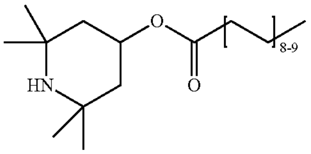

(B-3) 0 to 2 wt.-%, preferably 0.1 to 2 wt.-%, more preferably 0.2 to 2 wt.-%, based on the total weight of the molding composition (P), of a compound represented by the chemical formula (III):

(III)

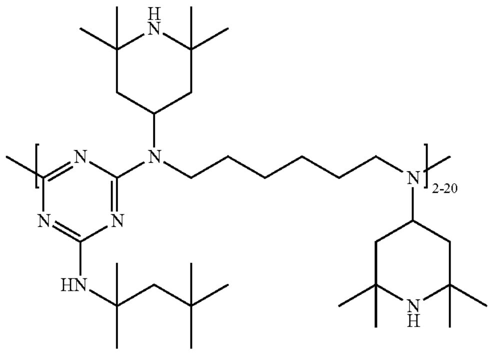

Dyes, Pigments, or Colorants (Component C)

As indicated above, the molding mass (P) may further comprise 0 to 5 wt.-%, often 0.1 to 3 wt.-% of further dyes, pigments, or colorants which may be added in form of master batches comprising the dyes, pigments, or colorants in a polymer matrix. In a preferred embodiment, the dyes, pigments, or colorants are added in form of a master batch comprising 20 to 70 wt.-%, based on the total amount of the master batch, of dyes, pigments, colorants or mixtures thereof and 30 to 80 wt.-% based on the total amount of the master batch, a copolymer of an vinylaromatic olefin and acrylonitrile as matrix polymer. Preferably, the matrix polymer is selected from poly(styreneacrylonitrile) (SAN), poly (alpha-methyl styrene/acrylonitrile) (AMSAN), and/or poly (styrene-methyl methacrylate) (SMMA). In this context, master batch formulations with matrix polymers comprising the monomers ethylene or propylene such as polyethylene, polypropylene and copolymers of ethylene and propylene are excluded from the list of constituents that may be used as component D. Such components are listed in the component E section.

Examples of suitable pigments as optional Component (C) include titanium dioxide, phthalocyanines, ultramarine blue, iron oxides and carbon black, and also the entire class of organic pigments. Examples of suitable colorants include all dyes that may be used for the transparent, semi-transparent, or non-transparent coloring of polymers, in particular those suitable for coloring styrene copolymers.

Further Additives (Optional Component D)

As used herein, the one or more further additives (D) may be any additives usable in molding composition (P) and not described in any of the components (A), (B) (C) or (E). For example, a further additive (D) may be selected from the group consisting of plasticizers, aliphatic amide waxes, aliphatic fatty acid esters, and further UV stabilizers that are not listed as component (C).

Optionally, various additives may be added to the molding compounds in amounts of from 0 to 5 wt.-%, often 0.1 to 5 wt.-%, as assistants and processing additives. Suitable added additives (D) include all substances customarily employed for processing or finishing the polymers.

Additives (D) may be added in form of master batches comprising additives (D) in a polymer matrix. In a preferred embodiment, the additives (D) are added in form of a master batch comprising 20 to 70 wt.-%, preferably 40 to 60 wt.-%, based on the total amount of the master batch, of additives (D) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(alpha-methyl styrene/acrylonitrile) (AMSAN), and/or poly(styrene-methyl methacrylate) (SMMA). In this context, master batch formulations with matrix polymers comprising the monomers ethylene or propylene such as polyethylene, polypropylene and copolymers of ethylene and propylene are excluded from the list of constituents that may be used as component D. Such components are listed in the component E section.

Examples of additives (D) include, for example, antistatic agents, antioxidants, flame retardants, stabilizers for improving thermal stability, stabilizers for increasing photostability, stabilizers for enhancing hydrolysis resistance and chemical resistance, antithermal decomposition agents and in particular lubricants that are useful for production of molded bodies/articles. These further added substances may be admixed at any stage of the manufacturing operation, but preferably at an early stage in order to profit early on from the stabilizing effects (or other specific effects) of the added substance.

Examples of suitable antistatic agents include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox® range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 μm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molar mass Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used, they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and/or compounds having analogous structures and also butylated condensation products of p-cresol and dicyclopentadiene. Other HALS stabilizers (hindered amine light stabilizers) not listed above as component B, benzophenones, resorcinols, salicylates, benzotriazoles are also suitable. Other suitable compounds include, for example, thiocarboxylic esters. Also usable are $C_6$-$C_{20}$ alkyl esters of thiopropionic acid, in particular the stearyl esters and lauryl esters.

It is also possible to use the dilauryl ester of thiodipropionic acid (dilauryl thiodipropionate), the distearyl ester of thiodipropionic acid (distearyl thiodipropionate) or mixtures thereof. Examples of further additives include UV absorbers such as 2H-benzotriazol-2-yl-(4-methylphenol).

Suitable lubricants and demolding agents include stearic acids, stearyl alcohol, stearic esters, and/or generally higher fatty acids, derivatives thereof and corresponding fatty acid mixtures comprising 1 to 45 carbon atoms. In a further preferred embodiment, the composition comprises amide compounds having the formula $R^1$—CONH—$R^2$, wherein $R^1$ and $R^2$ are each independently selected from aliphatic, saturated or unsaturated hydrocarbon groups having 1 to 30 carbon atoms, preferably 12 to 24 carbon atoms, in particular 16 to 20 carbon atoms. In a further preferred embodiment of the invention, the composition may additionally comprise fatty acid ester compounds having the formula $R^3$—CO—$OR^4$, wherein $R^3$ and $R^4$ are each independently selected from aliphatic, saturated or unsaturated hydrocarbon groups having 1 to 45 carbon atoms, preferably 15 to 40 carbon atoms, in particular 25 to 35 carbon atoms. Also particularly suitable is ethylene-bis(stearamide).

In a further preferred embodiment, the molding composition (P) may comprise an organic, inorganic or mixed phosphate, in particular an alkaline metal or earth alkaline metal phosphate such as $Ca_3(PO_4)_2$ and/or an organophosphate having alkyl or aryl groups comprising 1 to 12 carbon atoms.

In a further preferred embodiment, molding composition (P) may further comprise a polyester modified polysiloxane, in particular a polyester-polysiloxane-block copolymer, preferably a [polyester-b-polysiloxane-b-polyester] triblock copolymer. Preferred examples of the polysiloxane moieties comprised in the polyester-polysiloxaneblockcopolymer are derived from poly(dimethylsiloxane), poly(diethylsiloxane), poly(dipropylsiloxane), poly(dibutylsiloxane), and mixtures thereof.

Oligomers and/or polymers comprising ethylene repeating units and/or propylene repeating units (Component E)

As described above the thermoplastic molding composition (P) of this invention does contain no or below 0.1 wt.-%, preferably below 0.05 wt.-%, based on the total weight of the molding composition (P), of any polymeric or oligomeric component (E) comprising the monomers ethylene or propylene.

Such components are conventionally added to molding compositions (P) in the form of master batches containing any of the components (B), (C) or (D) with matrix polymers comprising of the monomers ethylene or propylene such as ethylene homopolymers (polyethylene), propylene homopolymers and homooligomers (polypropylene) and ethylene/propylene copolymers and homooligomers (poly(ethylene-co-propylene). An example for such a component (E) is a master batch of component (B-2) at 50 wt.-% in a polypropylene matrix commercially available e.g. as Cyasorb® UV-3853PP5 from the company Solvay.

A further examples for a component (E) are master batches of carbon black (C) in polyethylene such as commercially available as Eupolen® PE Black from the company BASF SE.

Another example for component (E) are additives (D) comprising polymers of ethylene or propylene such as polyolefin waxes usually used as lubricants or demolding agents. Examples are polyethylene or polypropylene waxes such as the commercially available polyethylene wax Licocene® PE 4201 from the company Clariant.

In one embodiment of the invention, the thermoplastic molding composition (P) comprises 0.001 wt.-% to 0.1 wt.-%, preferably 0.001 wt.-% to 0.05 wt.-%, based on the total weight of the molding composition (P), of oligomers and/or polymers comprising ethylene repeating units and/or propylene repeating units (as component E). In this aspect of the invention, the thermoplastic molding composition (P) comprises as component (E) 0.001 wt.-% to less than 0.1 wt.-%, preferably 0.005 wt.-% to 0.05 wt.-%, based on the total weight of the molding composition (P), of one or more oligomeric or polymeric components (E) comprising repeating units derived from ethylene monomers or propylene monomers, in particular ethylene homopolymers (polyethylene), propylene homopolymers and homooligomers (polypropylene) and ethylene/propylene copolymers and cooligomers (poly(ethylene-co-propylene), wherein the constituents (A) to (E) sum up to 100 wt.-% of the molding composition (P).

In an alternative embodiment of the invention the thermoplastic molding composition (P) comprises 0 wt.-%, based on the total weight of the molding composition (P), of oligomers and/or polymers comprising ethylene repeating units and/or propylene repeating units (as component E). In this aspect of the invention, the thermoplastic molding composition (P) comprises essentially no oligomeric or polymeric components (E) comprising repeating units derived from ethylene monomers or propylene monomers, in particular ethylene homopolymers (polyethylene), propylene homopolymers and oligomer (polypropylene) and ethylene/propylene copolymers and homooligomers (poly (ethylene-co-propylene), wherein the constituents (A) to (E) sum up to 100 wt.-% of the molding composition (P). Essentially no oligomeric or polymeric components (E) in this respect means that the molding composition (P) comprises less than 0.001 wt.-%, based on the total weight of the molding composition (P), of oligomeric or polymeric components (E).

Preparation of the Molding Composition (P)

The method according to the present invention may have any procedural steps suitable for conducting the claimed method.

In a preferred embodiment, the step of compounding the components comprises at least the following steps:

(i) providing the components (A) to (E) in the predetermined amounts to an optionally heatable mixing device; and (ii) blending the components (A) to (E) in the optionally heatable mixing device at temperatures above the glass transition point of the components (A) to (E) to obtain the molding composition (P).

Optionally, a step in which a homogenous particulate material mixture is prepared from the components (A) to (E) may be carried out prior to step (ii). However, also when provided to the optionally heatable mixing device without previous mixing, a homogenous mixing is typically achieved in the optionally heatable mixing device.

Each of components (A) to (E)—as far as solid—may be provided in form of particulate materials having different particle sizes and particle size distributions (e.g., as pellets, granules and/or powders).

The particulate materials (A) to (E) may be provided to a mixing device in the required amounts and ratios as previously indicated and optionally mixed prior to the blending step (ii) in order to obtain a homogenous particulate material mixture. In a preferred embodiment, this may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known by the person skilled in the art. Components (A) and (B), and—where included—(C), (D) and/or (E) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method include discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

Optionally, the method may comprise a further step (iii) of cooling the blend obtained from step (ii) to temperatures below the glass transition point of the components (A) to (E) to obtain the molding composition (P).

A preferred mixing apparatus used is an extruder or a kneader. Particularly suitable for melt extrusion are, for example, single-screw or twin-screw extruders. A twin-screw extruder is preferred. In some cases, the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based polymer composition (A) and the components (B), (C), (D) and (E) and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150 to 400, preferably 170 to 300° C.

In a preferred embodiment, a heatable twin-screw extruder and a speed of 50 to 150 rpm, preferably 60 to 100 rpm is employed. In a preferred embodiment, an extruding temperature of 170 to 270° C., preferably 210 to 250° C. is employed to obtain the molding composition (P). The molding composition (P) may be directly used, e.g. in molding processes, preferably injection molding processes, or may be processed to form granules which may be subjected to molding processes afterwards. The molding processes are preferably carried out at temperatures of 170 to 270° C., in particular 210 to 250° C. to result in a molded article.

Processing may be carried out using the known processes for thermoplastic processing, in particular production may be effected by thermoforming, extruding, injection molding, calendaring, blow molding, compression molding, press sintering, deep drawing or sintering, preferably by injection molding.

Applications and Properties

The present invention further relates to an article, in particular a molded article (T), prepared from a molding composition (P) or a polymer composition comprising a molding composition (P) in combination with a further thermoplastic polymer as described above. The article, in particular the molded article, may be prepared by any known processes for thermoplastic processing. In particular preparation may be effected by thermoforming, extruding, injection molding, calendaring, blow molding, compression molding, press sintering, deep drawing or sintering, preferably by injection molding.

In particular, the molding composition (P) according to the invention may preferably be used for preparing a molded article (T) comprising high gloss surface areas with gloss levels above 75 gloss units prepared from a thermoplastic molding composition (P) as previously described, wherein the gloss level is determined according to DIN EN ISO 2813 at a measuring angle of 60°.

Thus, the invention also relates to a molded article (T) prepared from the molding composition (P), in particular a molded article (T) high gloss surface areas with gloss levels above 75 gloss units prepared from a thermoplastic molding composition (P) as previously described, wherein the gloss level is determined according to DIN EN ISO 2813 at a measuring angle of 60°.

The molding composition (P) and the article, in particular the molded article (T), may be advantageously used for the manufacture of components or articles for electronic devices, household goods and exterior and/or interior automotive parts, in particular for the manufacture of visible components or articles. A preferred application is the use of unpainted exterior automotive parts such as front grills or side mirrors.

Molded articles (T) with preferably high gloss surface areas with gloss levels above 75 gloss units prepared from a thermoplastic molding composition (P) as previously described in unpainted exterior, preferably automotive applications, wherein the gloss level is determined according to DIN EN ISO 2813 at a measuring angle of 60°. However, preferred applications may be found in unpainted exterior applications, preferably automotive applications.

Automotive producers using unpainted high gloss parts in exterior applications usually require that the surface experiences only minor appearance changes after 3200 h weathering with ISO 4892-2A conditions. Maximum acceptable appearance changes are usually accepted by automotive producers in the range of a color shift of dE<6 and a gloss retention above 75% (i.e. a gloss level of above 75% of the gloss level before weathering) and thus this criterion shall be applied as definition of acceptable appearance change within this invention.

The molding composition (P) according to the present invention is characterized by its specific properties with respect to the quality of a high gloss surface area on a molded article (T) produced from said molding composition (P) after being subjected to artificial weathering. In particular, said high gloss surface area on a molded article (T) produced from said molding composition (P) that exhibits a gloss level above 75 gloss units before any weathering exposure, keeps a gloss level of above 75%, preferably above 80%, of the gloss level before weathering after being subjected to artificial weathering according to ISO 4892-2A for 2400 h, wherein the gloss level is determined according to DIN EN ISO 2813 at a measuring angle of 60°.

Additionally, a high gloss surface area on a molded article (T) produced from said molding composition (P) that exhibits a gloss level above 75 gloss units before any weathering exposure exhibits a color shift dE as measured in reference to the unexposed surface of below dE=6, preferably below dE=5, in particular below dE=4, after being subjected to artificial weathering according to ISO 4892-2A for 2400 h, wherein the gloss level is determined according to DIN EN ISO 2813 at a measuring angle of 60°.

The invention also relates to a method for reducing mold deposit formation upon the molding of high gloss surface molded articles (T) with gloss levels above 75 gloss units on at least a part of the surface area of the molded article (T), wherein the gloss level is determined according to DIN EN ISO 2813 at a measuring angle of 60°, wherein said method comprises the step of compounding the constituents (A) to (E) as previously described and wherein the reduction of mold deposit formation is observed as followed:

reduction of the extent of formation of mold deposit during production of molded high gloss parts as assessed by visual inspection of the deposit formation on the mold in the vicinity of a weld line after production of 500 injection molded test specimens produced from the molding composition (P) in comparison to the extent of mold deposit formation from a comparative molding composition (P') molded and assessed with same conditions, wherein the comparative molding composition (P') is obtained by compounding the components (A) to (E) contained in the molding composition (P) as previously described and additionally at least 0.1 wt.-%, based on the total weight of the molding composition (P') of at least one oligomeric and/or polymeric components comprising ethylene repeating units and/or propylene repeating units.

The invention is further illustrated by the claims and examples.

EXAMPLES AND COMPONENTS

Component A: The thermoplastic polymer composition (A) is an acrylonitrile styrene acrylate (ASA), i.e., an impact modified poly(styrene-acrylonitrile) (SAN) comprising SAN grafted on a butyl acrylate (BA) core (BA-g-SAN) (A-1a) and (A-1b) with the below-specified properties.

Thermoplastic matrix polymer component A-2a: AMSAN (30 wt.-% ACN, 70 wt.-% alpha-methylstyrene, VN 57 ml/g)

Thermoplastic matrix polymer component A-2b: SAN (35% ACN, VN 80 ml/g)

Component B-1: hindered amine light stabilizer (HALS) Tinuvin® 770 from BASF

Component B-2: hindered amine light stabilizer (HALS) Cyasorb® UV-3853 from Solvay as 50 wt.-% master batch in AMSAM (30 wt.-% acrylonitrite, 70 wt.-% alpha-methylstyrene, viscosity number 57 ml/g)

Component B-3: hindered amine light stabilizer (HALS) Chimassorb® 944 from BASF

Component C-1: Carbon black Black Pearls® 880 from Cabot as 30 wt.-% master batch in SAN with 24% acrylonitrile and viscosity number 64 ml/g.

Component D-1: Bis(2-propylheptyl)phthalate (DPHP) is a plasticizer

Component E-1: Polyethylene wax Licocene® PE 4201 available from Clariant

Component E-2: hindered amine light stabilizer (HALS) Cyasorb® UV-3853 from Solvay as 50 wt.-% master batch in polypropylene: Cyasorb® UV3853PP5 from Solvay Component E-3: Eupolen® PE Black from BASF SE, master batch with 40% carbon black in polyethylene.

Preparation of Basic Rubber Latex L1

The reaction vessel was charged with 90.2 parts by weight of demineralized water, 0.61 parts by weight of the sodium salt of a C12- to C18-paraffin sulfonic acid and 0.23 parts by weight sodium bicarbonate. When the temperature in the reaction vessel reached 59° C., 0.16 parts by weight of sodium persulfate, dissolved in 5 parts by weight of demineralized water, were added. A mixture of 59.51 parts by weight butyl acrylate and 1.21 parts by weight tricyclodecenyl acrylate were added within a period of 210 min.

Afterwards the reaction was continued for 60 min. Finally, the polymer dispersion had a total solid content of 39.6% and the latex particles had a particle diameter of 75 nm (determined by turbidity).

Preparation of Graft Rubber Latex (Component A-1a)

An amount of 151.9 parts by weight of the basic latex were added to the reaction vessel together with 92.2 parts by weight of demineralized water and 0.14 parts by weight of sodium persulfate, dissolved in 3.22 parts by weight of demineralized water. Within a period of 190 min a mixture of 31.18 parts by weight of styrene and 9.31 parts by weight of acrylonitrile were added at a temperature of 61° C., followed by a post polymerization time of 60 min at 65° C. A polymer dispersion with a total solid content of 35.5% was obtained. The latex particles had a diameter 87 nm (determined by turbidity). After synthesis, the latex was coagulated with magnesium sulfate solution at a temperature of approximately 60° C., followed by a sintering step at approximately 90° C. The resulting slurry was centrifuged yielding a wet rubber powder which was further processed.

Preparation of Basic Rubber Latex L2

The reaction vessel was charged with 70.66 parts by weight of demineralized water, 0.3 parts by weight of latex L1 and 0.23 parts by weight of sodium bicarbonate. After heating the reaction vessel to 60° C., 0.16 parts by weight of sodium persulfate, dissolved in 5 parts by weight demineralized water, were added to the reaction mixture. A mixture of 59.51 parts by weight butyl acrylate and 1.21 parts by weight tricyclodecenyl acrylate were added within a period of 210 min. In parallel to the first feed a solution of 0.36 parts by weight of the sodium salt of a C12- to C18-paraffin sulfonic acid in 16.6 parts by weight demineralized water were also added over a period of 210 min. After 200 min, from starting the feed, the temperature is ramped to 65° C.

Afterwards the reaction was continued for 60 min at 65° C. Finally, the polymer dispersion had a total solid content of 39.4% and the latex particles have a particle diameter of 440 nm (determined by turbidity).

Preparation of Graft Rubber Latex (Component A-1b)

An amount of 154 parts by weight of the basic latex were added to the reaction vessel together with 88.29 parts by weight of demineralized water, 0.11 parts by weight of the sodium salt of a C12- to C18-paraffin sulfonic acid and 0.14 parts by weight of sodium persulfate, dissolved in 5.61 parts by weight of demineralized water.

The reaction mixture was heated to 61° C. Within a period of 60 min 13.16 parts by weight are added at a temperature of 61° C., followed by a post polymerization time of 90 min, where the temperature was increased from 61 to 65° C. Then a mixture of 20.5 parts by weight of styrene and 6.83 parts by weight of acrylonitrile were added to the reaction over a period of 150 min. The reaction was continued at 65° C. for another 60 min. A polymer dispersion with a total solid content of 35.2% was obtained. The latex particles had a diameter 500 nm (determined by turbidity). After synthesis the latex was coagulated with magnesium sulfate solution at a temperature of approximately 88° C., followed by a sintering step at approximately 130° C.

The resulting slurry was centrifuged yielding a wet rubber powder which was further processed Preparation of Molding Composition (P)

Examples and Comparative Examples of molding compositions were prepared by compounding all constituents using a twin screw extruder (model ZSK26MC, Coperion GmbH, length: 1035 mm) at Tm=240° C. according to the specific ratios given in Table 1. Sample plaques (approximately 7,5×5 cm) and other samples have been prepared via injection molding (Tm: 260° C.).

TABLE 1

Compounding Recipes

| in wt.-% | Comp Ex. 1 | Comp Ex. 2 | Comp Ex. 3 | Comp Ex. 4 | Ex. 1 | Ex. 2 |
|---|---|---|---|---|---|---|
| A-1a: (90 nm, BA-g-SAN) | 19.8 | 19.8 | 19.5 | 19.2 | 19.6 | 19.5 |
| A-1b: (500 nm, BA-g-SAN) | 13.1 | 13.0 | 12.9 | 12.7 | 12.9 | 12.9 |
| A-2a: AMSAN (30 wt.-% ACN, 70 wt.-% alpha-methylstyrene, VN 57 ml/g) | 29.2 | 29.1 | 28.8 | 31.2 | 28.9 | 28.8 |
| A-2b: SAN (35% ACN, VN 80 ml/g) | 33.9 | 33.9 | 33.5 | 32.9 | 33.6 | 33.5 |
| B-1: Tinuvin 770 | | 0.20 | 0.49 | 0.48 | 0.49 | 0.49 |
| B-2: Cyasorb 3853 as 50% MB in AMSAN (30 wt.-% ACN, 70 wt.-% alpha-methylstyrene, VN 57 ml/g) (Cyasorb content) | | | | | 0.59 (0.29) | 0.59 (0.29) |
| B-3: Chimassorb 944 | | | | | | 0.29 |
| C-1: Carbon black (as 30 wt.-% MB in SAN 24% ACN, VN 64 ml/g) (carbon black content) | 3.96 (1.19) | 3.95 (1.19) | 3.90 (1.17) | | 3.92 (1.18) | 3.90 (1.17) |
| D-1: Plasticizer DPHP | 0.05 | 0.05 | 0.05 | 0.05 | 0.05 | 0.05 |
| E-1: Polyethylene Wax | 0.34 | 0.34 | 0.34 | 0.34 | | |
| E-2: Cyasorb 3853 as 50% MB in polypropylene (Cyasorb content) | | | 0.59 (0.29) | 0.58 (0.29) | | |
| E-3: Eupolen ® PE Black (carbon black content) | | | | 2.59 (1.04) | | |

Examples and molding compounds with prefix "comp-" are for comparison

Herein, each BA-g-SAN (i.e., components A-1a and A-1b) comprises approximately 60 parts n-butyl acrylate (BA) containing a cross-linking agent, approximately 40 parts SAN (mass ratio styrene: acrylonitrile 1:3 to 1:4), and approximately 1 part of a further monomer such as, e.g., dihydrodicyclopentadienyl acrylate (DCPA) or tricyclodecenyl acrylate.

Weathering Conditions

The properties of the sample plaques were tested with respect to weathering conditions according to the following proceedings.

Simulation of moist warm climate was made according to ISO 4892-2A with the following parameter:

black standard 65±2° C. (dry phase: 35-45° C.), relative humidity: 70±10%;

irradiation: 0.51 W/m$^2$ at 340 nm (or 60 W/m$^2$ at a wavelength of 300-400 nm);

The test results were evaluated by color measurements according to DIN 6174 as well as gloss measurements according to DIN EN ISO 2813 at a measuring angle of 60°. All references to gloss levels and gloss measurements in this invention are understood to be measured according to these conditions.

Gloss retention in this invention is defined as the ratio in % between the measured gloss after weathering and the gloss before weathering. The results of the evaluation are given in Table 2.

To determine the extent of formation of deposit during production of the moldings, the abovementioned molding compositions and comparative molding compositions in the form of pellets were metered under identical conditions into an injection molding machine, and melted, and injection-molded in a mold for producing tensile specimens with a weld line and having no vents. Injection of the tensile specimen in this mold took place from the two ends, the result being that the two melt fronts met in the center of the mold and produced a weld line.

After every 500 shots, i.e. injection-molded test specimens, the mold was dismantled and the mold deposits occurring in the vicinity of the weld line were assessed visually and graded by a panel of persons skilled in the art on a scale from 1 (very good, no mold deposits) to 6 (unsatisfactory, high level of mold deposits).

The results of the evaluation are given in Table 2.

TABLE 2

Mold deposit formation and weathering results for high gloss surfaces

| in wt.-% | Comp Ex. 1 | Comp Ex. 2 | Comp Ex. 3 | Comp Ex. 4 | Ex. 1 | Ex. 2 |
|---|---|---|---|---|---|---|
| B1: Tinuvin 770 | | 0.20 | 0.49 | 0.48 | 0.49 | 0.49 |
| B2: Cyasorb 3853 as 50% MB in AMSAN (30 wt.-% ACN, 70 wt.-% alpha-methylstyrene, VN 57 ml/g) (Cyasorb content) | | | | | 0.59 (0.29) | 0.59 (0.29) |
| B3: Chimassorb 944 | | | | | | 0.29 |
| E1: Polyethylene Wax | 0.34 | 0.34 | 0.34 | 0.34 | | |
| E2: Cyasorb 3853 as 50% MB in polypropylene (Cyasorb content) | | | 0.59 (0.29) | 0.58 (0.29) | | |
| E3: Eupolen ® PE Black (carbon black content) | | | | 2.59 (1.04) | | |
| Results for high gloss plaques | | | | | | |
| Grade for mold deposit formation | 2 | 2-3 | 5-6 | 6 | 4 | 4 |
| Gloss 60° before weathering | 93.7 | 94.2 | 94.8 | 91.5 | 94.2 | 95.0 |
| Color Shift dE after ISO 4892-2A weathering | | | | | | |
| 1600 h | 17.1 | 2.3 | 2.0 | — | 1.8 | 2.2 |
| 2400 h | 18.0 | 14.5 | 4.6 | — | 3.2 | 1.6 |
| 3200 h | 16.8 | 18.7 | 17.7 | — | 17.3 | 15.1 |
| Gloss 60° retention in % after ISO 4892-2A weathering | | | | | | |
| 1600 h | 5.7 | 87.9 | 90.7 | — | 91.3 | 90.3 |
| 2400 h | 3.0 | 26.0 | 78.6 | — | 83.0 | 90.8 |
| 3200 h | 1.6 | 5.7 | 33.8 | — | 28.8 | 42.8 |

The results of mold deposit formation of Comp. Ex. 2 and Comp. Ex. 3 in Table 2 in comparison to Comp Ex. 1 show that the components B-1 and especially E-2 lead to increased deposits during the molding process. Comp Ex. 3 combining the use of components B-1 and E-2 shows significantly improved weathering performance with dE<5 and gloss retention above 75% after 2400 h weathering according to ISO 4892-2A compared to Comp. Ex. 1 and Comp. Ex. 2 showing that the components B-1 and E-2 are effective to improve weathering for 2400 h exposure but also lead to unacceptable mold deposit formation on high gloss surfaces.

The result of mold deposit formation in table 2 for Comp. Ex. 4 shows that the use of polyethylene as carrier material in a carbon black masterbatch even increases mold deposit formation in comparison to Comp. Ex. 3.

The inventive examples 1 and 2 in table 2 both show weathering performance similar to Comp. Ex. 3 with dE<5 and gloss retention above 75% after 2400 h exposure according to ISO 4892-2A but at the same time also show significantly reduced mold deposit formation when compared to Comp. Ex. 3 which is achieved by elimination of all components E containing polyolefins.

With the high gloss weathering stability after 2400 h and the same time low mold deposit formation of the examples of the inventive ASA formulation the technical demand outlined in this invention for high gloss surfaces can be answered.

The invention claimed is:

1. A thermoplastic molding composition (P) comprising:

(A) 81.1 to 99.7 wt.-%, based on the total weight of the molding composition (P), of at least one thermoplastic polymer composition (A) comprising:

(A-1) 5 to 50 wt.-%, based on the total weight of thermoplastic polymer composition (A), of at least one styrene-based graft copolymer (A-1), and (A-2) 40 to 80 wt.-%, based on the total weight of thermoplastic polymer composition (A), of a thermoplastic matrix (A-2) comprising 40 to 60 wt.-% of poly(styrene-acrylonitrile) (SAN) and 60 to 40 wt.-% of poly(alpha-methyl styrene/acrylonitrile) (AMSAN), based on the total weight of the thermoplastic matrix (A-2);

(B) at least one hindered amine light stabilizing composition (B) comprising:

(B-1) 0.2 to 0.9 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties at one of the 3, 4, or 5 positions of the piperidine structures, wherein the at least one hindered amine light stabilizer having a dipiperidine structure has a molecular weight of 200-550 g/mol, (B-2) a master batch composition comprising AMSAN and 0.1 to 0.9 wt.-%, based on the total weight of the molding composition (P), of at least one hindered amine light stabilizer compound having a monopiperidine structure with at least one alkyl group at each of the 2 and 6 positions of the monopiperidine structure and saturated or unsaturated C12-C21 ester moieties at at least one of the 3, 4, or 5 positions of the monopiperidine structures, and (B-3) 0 to 2 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4, or 5 positions of the piperidine groups, wherein the at least one hindered amine light stabilizer having a polymeric structure has a molecular weight of 1000-4000 g/mol;

(C) 0 to 10 wt.-%, based on the total weight of the molding composition (P), of one or more colorants, dyes, and/or pigments (C); and (D) 0 to 5 wt.-%, based on the total weight of the molding composition (P), of one or more further additives (D) different from (B) and (C); and optionally, (E) 0 to less than 0.1 wt.-%, based on the total weight of the molding composition (P), of oligomers and/or polymers comprising ethylene repeating units and/or propylene repeating units, wherein a polyolefin content of the thermoplastic molding composition (P) does not exceed 0.1 wt.-%, based on the total weight of the molding composition (P), and wherein the constituents (A) to (E) sum up to 100 wt.-% of the molding composition (P).

2. The molding composition (P) according to claim 1, wherein the hindered amine light stabilizing composition (B) comprises:

(B-1) 0.2 to 0.9 wt.-%, based on the total weight of the molding composition (P), of a compound represented by the chemical formula (I):

(I)

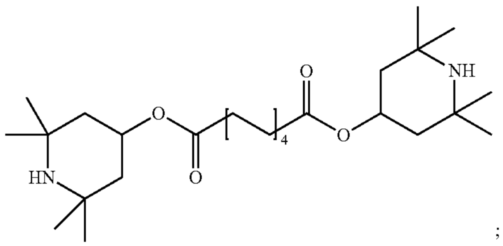

;

(B-2) 0.1 to 0.9 wt.-%, based on the total weight of the molding composition (P), of a composition comprising at least one compound represented by the chemical formula (II):

(II)

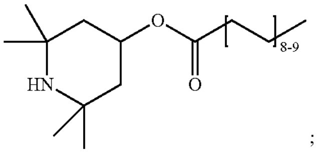

;

and (B-3) 0 to 2 wt.-%, based on the total weight of the molding composition (P), of a compound represented by the chemical formula (III):

(III)

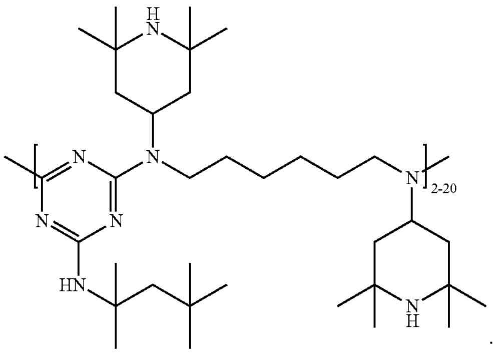

.

3. The molding composition (P) according to claim 1, comprising as component (E):

0.001 to less than 0.1 wt.-%, based on the total weight of the molding composition (P), of one or more oligomeric or polymeric components (E) comprising repeating units derived from ethylene monomers or propylene monomers, and wherein the constituents (A) to (E) sum up to 100 wt.-% of the molding composition (P).

4. The molding composition (P) according to claim 1, comprising essentially no oligomeric or polymeric components (E) comprising repeating units derived from ethylene monomers or propylene monomers, and wherein the constituents (A) to (E) sum up to 100 wt.-% of the molding composition (P).

5. The molding composition (P) according to claim 1, wherein the at least one graft copolymer (A-1) comprises an acrylonitrile styrene acrylate (ASA) copolymer comprising rubber particles having an average particle size $d_{50}$ from 50 to 1000 nm, wherein the average particle size is determined by scattered light measurement.

6. The molding composition (P) according to claim 1, wherein the at least one thermoplastic polymer composition (A) comprises at least one copolymer (A-2) comprising:

18 to 45 wt.-% of acrylonitrile repeating units; and 55 to 82 wt.-% of repeating units derived from styrene and/or alpha-methyl styrene.

7. The molding composition (P) according to claim 1, wherein the at least one thermoplastic polymer composition (A) comprises:

(A-1) 5 to 50 wt.-%, based on the thermoplastic polymer composition (A), of at least one graft copolymer (A-1) comprising an acrylonitrile styrene acrylate (ASA) copolymer comprising rubber particles having an average particle size $d_{50}$ from 50 to 1000 nm, wherein the average particle size is determined by scattered light measurement;

(A-2) 40 to 80 wt.-%, based on the thermoplastic polymer composition (A), of at least one thermoplastic matrix (A-2) comprising 18 to 45 wt.-%, based on the total weight of the thermoplastic matrix (A-2), of acrylonitrile repeating units and 55 to 82 wt.-%, based on the total weight of the thermoplastic matrix (A-2), of repeating units derived from styrene and/or alpha-methyl styrene; and (A-3) 0 to 55 wt.-%, based on the thermoplastic polymer composition (A), of one or more additional thermoplastic polymers (A-3) that is substantially free of ethylene repeating units and/or propylene repeating units.

8. The molding composition (P) according to claim 1, wherein the graft copolymer (A-1) comprises an acrylonitrile styrene acrylate (ASA) copolymer comprising rubber particles having a bimodal or trimodal size distribution and comprising:

(A-1a) at least one graft copolymer (A-1a) having an average particle size $d_{50}$ of the rubber particles in the ASA copolymer from 50 to 150 nm; and (A-1b) at least one graft copolymer (A-1b) having an average particle size $d_{50}$ of the rubber particles in the ASA copolymer from 200 to 750 nm.

9. The molding composition (P) according to claim 1, wherein a high gloss surface area on a molded article (T) produced from the molding composition (P) that exhibits a gloss level above 75 gloss units before any weathering exposure, keeps a gloss level of above 75% of the gloss level before weathering after being subjected to artificial weathering according to ISO 4892-2A for 2400 h, wherein the gloss level is determined according to DIN EN ISO 2813 at a measuring angle of 60°.

10. The molding composition (P) according to claim 1, wherein a high gloss surface area on a molded article (T) produced from the molding composition (P) that exhibits a gloss level above 75 gloss units before any weathering exposure exhibits a color shift dE as measured in reference to the unexposed surface of below dE=6 after being subjected to artificial weathering according to ISO 4892-2A for 2400 hours, wherein the gloss level is determined according to DIN EN ISO 2813 at a measuring angle of 60°.

11. A method for producing the thermoplastic molding composition (P) according to claim 1, the method comprising at least the following steps:

(i) providing the components (A) to (E) in the predetermined amounts to a mixing device; and (ii) blending the components (A) to (E) in the mixing device at temperatures above the glass transition point of the components (A) to obtain the molding composition (P).

12. A method for reducing mold deposit formation upon the molding of high gloss surface molded articles (T) with gloss levels above 75 gloss units on at least a part of the surface area of the molded article (T), wherein the gloss level is determined according to DIN EN ISO 2813 at a measuring angle of 60°, wherein the method comprises the step of compounding the constituents (A) to (E) according to claim 1, and wherein the reduction of mold deposit formation is observed as followed:

reduction of the extent of formation of mold deposit during production of molded high gloss parts as assessed by visual inspection of the deposit formation on the mold in the vicinity of a weld line after production of 500 injection molded test specimens produced from the molding composition (P) in comparison to the extent of mold deposit formation from a comparative molding composition (P') molded and assessed with same conditions, wherein the comparative molding composition (P') is obtained by compounding the components (A) to (E) contained in the molding composition (P) and additionally at least 0.1 wt.-%, based on the total weight of the molding composition (P'), of at least one oligomeric and/or polymeric components comprising ethylene repeating units and/or propylene repeating units.

13. A molded article (T) comprising high gloss surface areas with gloss levels above 75 gloss units prepared from a thermoplastic molding composition (P) according to claim 1, wherein the gloss level is determined according to DIN EN ISO 2813 at a measuring angle of 60°.

14. The molded article (T) according to claim 13, wherein the molded article (T) is an unpainted molded article for exterior applications.

15. The molded article (T) according to claim 14, wherein the unpainted molded article is for automotive applications.

* * * * *